US008095513B2

(12) United States Patent
Grunkemeyer et al.

(10) Patent No.: US 8,095,513 B2
(45) Date of Patent: Jan. 10, 2012

(54) SAFE BUFFER (75) Inventors: Brian M. Grunkemeyer, Redmond, WA (US); Alessandro P. Catorcini, Redmond, WA (US); Anthony J. Moore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1306 days.

(21) Appl. No.: 11/422,297

(22) Filed: Jun. 5, 2006

(65) Prior Publication Data

US 2007/0283113 A1 Dec. 6, 2007

(51) Int. Cl.
*G06F 7/00* (2006.01)
*G06F 12/00* (2006.01)
*G06F 17/30* (2006.01)
*G06F 17/00* (2006.01)

(52) U.S. Cl. ......... 707/687; 707/793; 707/802; 707/813
(58) Field of Classification Search .................. 707/687, 707/793, 802, 813, 999.1, 999.206
See application file for complete search history.

(56) References Cited

U.S. PATENT DOCUMENTS

| 5,367,671 | A | * | 11/1994 | Feigenbaum et al. ................ 1/1 |
| 5,644,709 | A | | 7/1997 | Austin |
| 5,765,154 | A | * | 6/1998 | Horikiri et al. ....................... 1/1 |
| 5,909,580 | A | * | 6/1999 | Crelier et al. .................. 717/141 |
| 5,983,213 | A | * | 11/1999 | Nakano et al. ..................... 707/1 |
| 5,995,964 | A | | 11/1999 | Hoshiina et al. |
| 6,018,745 | A | | 1/2000 | Kuftedjian |
| 6,065,020 | A | | 5/2000 | Dussud |
| 6,161,148 | A | | 12/2000 | Pratt et al. |
| 6,185,564 | B1 | | 2/2001 | Douceur et al. |
| 6,279,148 | B1 | | 8/2001 | Taivalsaari et al. |
| 6,542,926 | B2 | * | 4/2003 | Zalewski et al. .............. 709/213 |
| 6,578,129 | B1 | * | 6/2003 | da Silva Junior et al. .... 711/209 |
| 6,636,874 | B1 | * | 10/2003 | Douceur et al. ....................... 1/1 |
| 6,654,171 | B1 | * | 11/2003 | Hampel-Vogedes .......... 359/618 |
| 6,704,743 | B1 | * | 3/2004 | Martin ....................... 707/103 R |
| 6,938,085 | B1 | | 8/2005 | Belkin et al. |
| 7,451,249 | B2 | * | 11/2008 | Cowan et al. .................... 710/22 |
| 7,610,322 | B2 | | 10/2009 | Grunkemeyer et al. |
| 7,707,232 | B2 | | 4/2010 | Dussud et al. |
| 7,822,938 | B2 | | 10/2010 | Dussud et al. |
| 2002/0004917 | A1 | * | 1/2002 | Malcolm et al. .................. 714/4 |
| 2002/0169786 | A1 | | 11/2002 | Richek |
| 2002/0174405 | A1 | * | 11/2002 | Janssen ............................ 716/3 |
| 2003/0231855 | A1 | | 12/2003 | Gates et al. |
| 2004/0015876 | A1 | | 1/2004 | Applin |
| 2004/0103252 | A1 | * | 5/2004 | Lee et al. ....................... 711/132 |
| 2004/0107227 | A1 | | 6/2004 | Michael |

(Continued)

OTHER PUBLICATIONS

T.M. Austin et al., "Efficient Detection of All Pointer and Array Access Errors", Proceedings of the ACM SIGPLAN 1994 conference on Programming language design and implementation, 1994, pp. 290-301, Orlando, Florida, United States.

(Continued)

*Primary Examiner* — Mohammad Ali
*Assistant Examiner* — Patrick Darno
(74) *Attorney, Agent, or Firm* — Toler Law Group, PC (57) ABSTRACT

A method and system for implementing a safe buffer is described herein. The method includes implementing a buffer class that ensures that accesses to memory are performed in a safe manner. The buffer class may be a handle to protected resources in memory. The buffer class may exploit methods to read and write to memory that ensures that read and writes are performed to valid memory locations within buffer bounds.

20 Claims, 3 Drawing Sheets

U.S. PATENT DOCUMENTS

| | | |
|---|---|---|
| 2004/0187100 A1 | 9/2004 | Thiruvillamalai |
| 2005/0097535 A1 | 5/2005 | Plum |
| 2005/0204045 A1 | 9/2005 | Belkin et al. |
| 2006/0004805 A1 | 1/2006 | Grunkemeyer et al. |
| 2006/0031810 A1 | 2/2006 | Peng et al. |
| 2006/0064545 A1 | 3/2006 | Wintergerst |
| 2006/0242369 A1 | 10/2006 | Thelen |
| 2006/0251095 A1 | 11/2006 | Kukoleca et al. |

OTHER PUBLICATIONS

George C. Necula et al., "CCured: Type-Safe Retrofitting of Legacy Software", ACM Transactions on Programming Languages and Systems (TOPLAS), May 2005, pp. 477-526, vol. 27, Issue 3.

Lei Wang et al., "Enhancing Security Using Legality Assertions Using TXL", 12th Working Conference on Reverse Engineering (WCRE'05), 2005, pp. 35-44.

International Search Report and the Written Opinion for International Application No. PCT/US2008/066138 received from the Korean Intellectual Property Office (ISA/KR), mailed Dec. 30, 2008, 9 pages.

Sarmoria et al., "Monitoring Access to Shared Memory-Mapped Files," Digital Forensic Research Workshop (DFRWS), 2005, New Orleans, LA, 10 pages.

Kath, Randy, "Managing Memory-Mapped Files," <<http://msdn.microsoft.com/en-us/library/ms810613(d=printer).aspx>>, msdn, created Feb. 9, 1993, printed Sep. 9, 2011, 15 pages.

RWILLY64, "Handling Unmanaged Memory Pointers in Managed Memory," http://www.codeproject.com/Kb/cs/unmanaged_memory_pointers.aspx>>, The Code Project Open License (CPOL), dated Dec. 19, 2005, printed Sep. 9, 2011, 5 pages.

Non-Final Office Action for U.S. Appl. No. 10/853,420 received from the United States Patent and Trademark Office (USPTO), mailed Nov. 16, 2006, 17 pages.

Final Office Action for U.S. Appl. No. 10/853,420 received from the United States Patent and Trademark Office (USPTO), mailed Jun. 4, 2007, 20 pages.

Advisory Action for U.S. Appl. No. 10/853,420 received from the United States Patent and Trademark Office (USPTO), mailed Sep. 17, 2007, 3 pages.

Non-Final Office Action for U.S. Appl. No. 10/853,420 received from the United States Patent and Trademark Office (USPTO), mailed Dec. 26, 2007, 19 pages.

Final Office Action for U.S. Appl. No. 10/853,420 received from the United States Patent and Trademark Office (USPTO), mailed Jul. 24, 2008, 23 pages.

Non-Final Office Action for U.S. Appl. No. 10/853,420 received from the United States Patent and Trademark Office (USPTO), mailed Feb. 4, 2009, 31 pages.

Notice of Allowance and Fees Due for U.S. Appl. No. 10/853,420 received from the United States Patent and Trademark Office (USPTO), mailed Jun. 25, 2009, 11 pages.

Non-Final Office Action for U.S. Appl. No. 11/820,852 received from the United States Patent and Trademark Office (USPTO), mailed Dec. 9, 2009, 14 pages.

Non-Final Office Action for U.S. Appl. No. 11/820,852 received from the United States Patent and Trademark Office (USPTO), mailed Jan. 5, 2011, 14 pages.

Non-Final Office Action for U.S. Appl. No. 11/820,852 received from the United States Patent and Trademark Office (USPTO), mailed Jun. 28, 2011, 14 pages.

"Memory Mapped Files," <<http://www.ecst.csuchico.edu/~beej/guide/ipc/mmap.html>>, Brian "Beej" Hall, printed Feb. 22, 2007, 5 pages.

* cited by examiner

SAFE BUFFER

BACKGROUND

Modules operating on computer systems typically require access to shared resources. As examples, an application launched by an operating system may require access to files that are maintained by a file system, or the application may require access to network connections maintained by a network driver. Network drivers may require access to information structures maintained by a network packet classifier. This is a complex arrangement that includes numerous software modules, such as software drivers requiring access to many shared resources and an access supervisor that either maintains the resources or at least intercedes when a software module attempts to access a resource.

Intercession by an access supervisor is important for several reasons. For instance, when a first software module deletes a resource, other software modules that maintain direct pointers to the resource are unable to access or use the resource because their pointers no longer point to a valid resource. One solution to this problem involves having an access supervisor intervene when a software module requires access to a particular resource. Such intervention ensures that a particular resource still exists before the software module is granted access to the particular resource. Typically, such intervention is accomplished by the access supervisor issuing a handle to each software module for a particular resource instead of allowing each software module a direct pointer to that particular resource.

A handle is associated with a resource and is used to refer to a particular resource when it is desired to be used by a software module. The software module does not use the handle to directly access the resource. Rather, the software module makes requests to the access supervisor for operations to be performed on the resource. The handle is presented as part of these requests to identify the resource that should be operated on. Further, multiple threads of a single program may request that operations be performed on the same resource by specifying the same handle to the access supervisor.

Handle administration systems are typically characterized by having handles that can assume either an allocated state or an unallocated state. When a handle is in the allocated state, the access supervisor has associated that handle with a resource. The handle can then be used by a software module when the software module desires to perform an operation on the resource. To perform an operation on the resource, the software module makes a request to the access supervisor for a given operation and provides the handle to identify the resource on which the operation is to be performed. The access supervisor then checks to determine whether the handle is valid. If the handle is valid, then the operation may be performed. If the handle is not valid, then an appropriate notification to the software module may be generated.

When a handle is in the unallocated state, it is not associated with any resource and thus cannot be used to access a resource. A handle is in the unallocated state if it is never allocated or when it is "released." A handle can be released by the software module that allocated it from the access supervisor. Releasing a handle means that the handle is no longer being used to access the resource with which it was formerly associated. Once a handle is released, it is available to be associated with another resource and thereby returned to the allocated state.

However, handles are not always released properly, and the consequences of an improper handle release can be quite costly in terms of correctness, performance, and security. For example, a thread that opens a file may simply fail to close the file, resulting in a handle pointing to the file being leaked. Or, when a thread is terminated, a handle may fail to be released and the corresponding resource, to which the handle refers, may be leaked. Handle leaks like these can compromise program and overall computer performance over time, or simply cause a program to stop working. Furthermore, handle management with semi-trusted code may result in security vulnerabilities in a multithreaded environment.

One method of solving this problem is described in U.S. application Ser. No. 10/853,420, entitled "Safe Handle", filed May 25, 2004. A handle is wrapped with a wrapper that includes a counter to tabulate the number of threads currently using the handle. The counter may be used to determine whether there are any operations being performed on the handle. The release of the handle may then be prevented while operations are being performed on the handle.

For memory accesses, problems may arise when a write to a memory resource occurs while the memory resource is being freed. This may occur when garbage collection occurs prematurely on a resource and a finalizer releases the memory resource while another thread is attempting a write. In that case, the memory may no longer be valid for a write. It is difficult to write unsafe managed code that can safely use pointers without the risk of accessing freed memory in the process space.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for implementing a safe buffer. In accordance with one implementation of the described technologies, a buffer class is implemented that ensures that accesses to memory are performed in a safe manner. The buffer class may be a handle to protected resources in memory. The buffer class may exploit methods to read and write to memory that ensures that reads and writes are performed to valid memory locations within buffer bounds. These methods may provide protection against incorrect or malicious handle usage from multiple threads.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
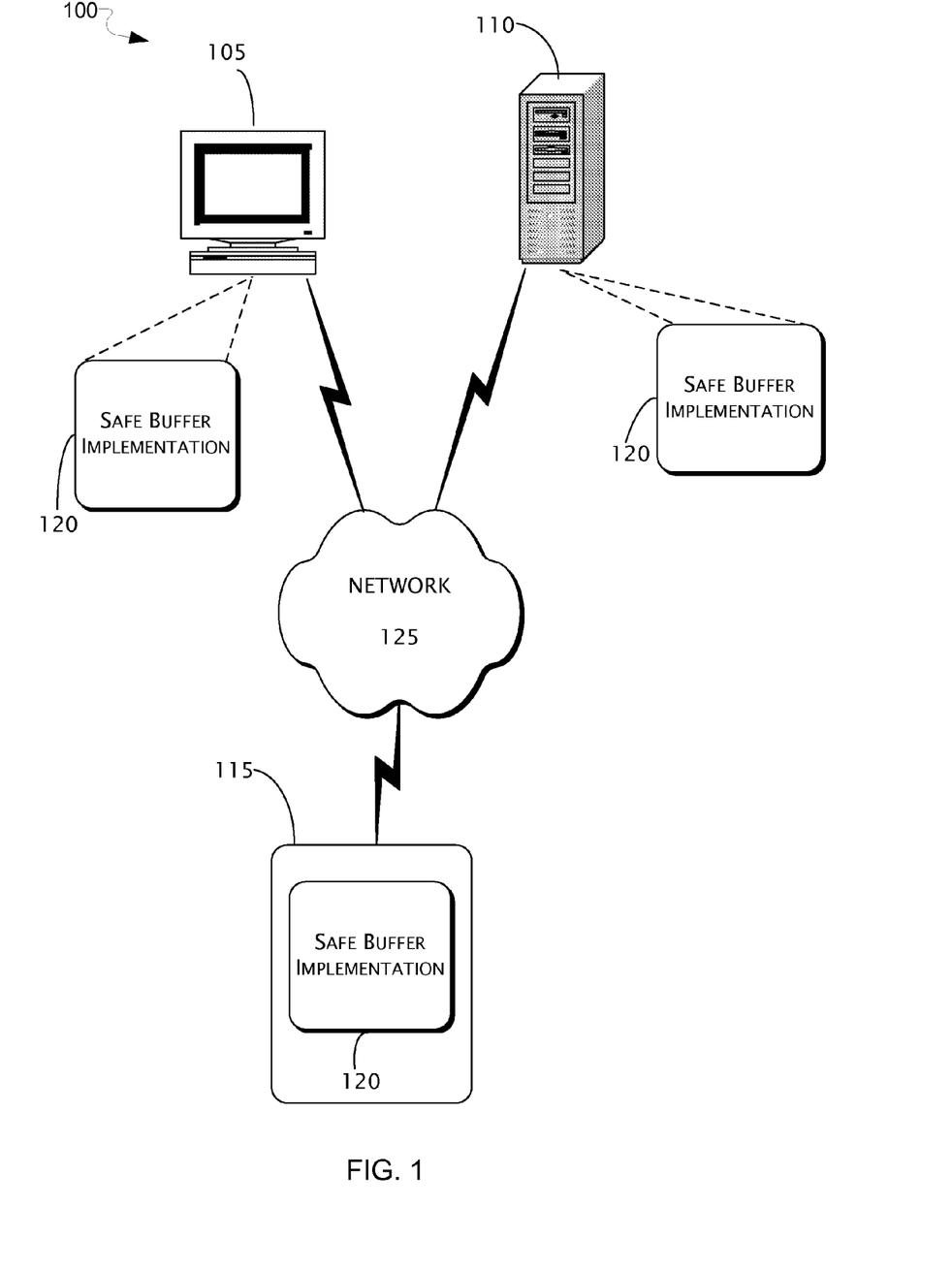
FIG. 1 illustrates an example network environment in which example technologies may be implemented for a safe buffer.

FIG. 1 illustrates an example network environment 100 in which example technologies may be implemented for a safe buffer. However, such example technologies are not limited to network environments. Such technologies may include, but are not limited to, tools, methodologies, and systems, associated with a safe buffer implementation 120, as described herein. In FIG. 1, client device 105, server device 110, and "other" device 115 may be communicatively coupled to one another via network 125; and, further, at least one of client device 105, server device 110, and "other" device 115 may be capable of implementing the aforementioned technologies.

Client device 105 may represent at least one of a variety of known computing devices, including a desktop personal computer (PC), workstation, mainframe computer, Internet appliance, set-top box, or gaming console, that is able to implement example technologies for a safe buffer. Client device 105 may further represent at least one device that is capable of being associated with network 125 by a wired and/or wireless link, including but not limited to a mobile telephone, personal digital assistant (PDA), and laptop computer. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation for a safe buffer. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of a safe buffer implementation 120 according to one or more of the example technologies described herein. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (LANs), such as an 802.11 system or, on a larger scale, a wide area network (WAN), or a personal area network (PAN), such as Bluetooth.

Computer architecture in at least one of devices 105, 110, and 115 has typically defined computing platforms in terms of hardware and software. Software for computing devices has been categorized into groups, based on function, which may include: a hardware abstraction layer (HAL), an operating system (OS), and applications.

A runtime execution environment may reside between an OS and an application, program, function, or other assemblage of code. The runtime execution environment may serve as a space in which the application, program, function, or other assemblage of code may execute specific tasks on any one or more of processing devices 105, 110, and 115. More particularly, a runtime execution environment may enhance the reliability of the execution of an application, program, function, or other assemblage of code on a growing range of processing devices 105, 110, and 105, including servers, desktop computers, laptop computers, and mobile processing/communication devices by providing a layer of abstraction and services for an application running on such devices, and by further providing the application, program, function, or other assemblage of code with capabilities including memory management and configuration thereof.

A runtime execution environment may serve as at least one of a programming and an execution platform. As a programming platform, a runtime execution environment may compile one or more targeted applications, programs, functions, or other assemblages of code, which may be written in one of multiple computing languages, into an intermediate language (IL) or bytecode. IL is typically independent of the platform, and the central processing unit (CPU) executes IL. In fact, IL is a higher level language than many CPU machine languages.

As an execution platform, a runtime execution environment may interpret compiled IL into native machine instructions. A runtime execution environment may utilize either an interpreter or a compiler to execute such instructions. Regardless, the native machine instructions may then be directly executed by the CPU. Since IL is CPU-independent, IL may execute on any CPU platform as long as the OS running on that CPU platform hosts an appropriate runtime execution environment.

Alternatively, at least portions of applications, programs, functions, or other assemblages of code may be precompiled and loaded as one or more native image files in the runtime execution environment, thus circumventing CPU consumption required for compilation. Effectively, the precompiled portions are software modules that are distributed in an IL format (e.g. assemblies, methods, or types) rather than in a native platform execution format. A source of such precompiled IL may be disposed in either of a non-managed execution environment or a separate implementation of a runtime execution environment on a same or separate one of devices 105, 110, and 115. The source may deploy the precompiled IL during or before install time for the application, program, method, function, or other assemblage of code to which the precompiled IL corresponds.

Regardless, examples of runtime environments, in which technologies for a safe buffer may be implemented, include: Visual Basic runtime environment; Java® Virtual Machine runtime environment that is used to run, e.g., Java® routines; or Common Language Runtime (CLR) to compile, e.g., Microsoft NET™ applications into machine language before executing a calling routine. However, this listing of runtime environments provides examples only. The example technologies described herein are not limited to just these managed execution environments. More particularly, the example implementations are not just limited to managed execution environments, for one or more examples may be implemented within testing environments and/or unmanaged execution environments.

An application, program, function, or other assemblage of code compiled into IL may be referred to as "managed code," and that is why a runtime execution environment may be alternatively referred to as a "managed execution environment." It is noted that code that does not utilize a runtime execution environment to execute may be referred to as a native code application.

Figure 2:
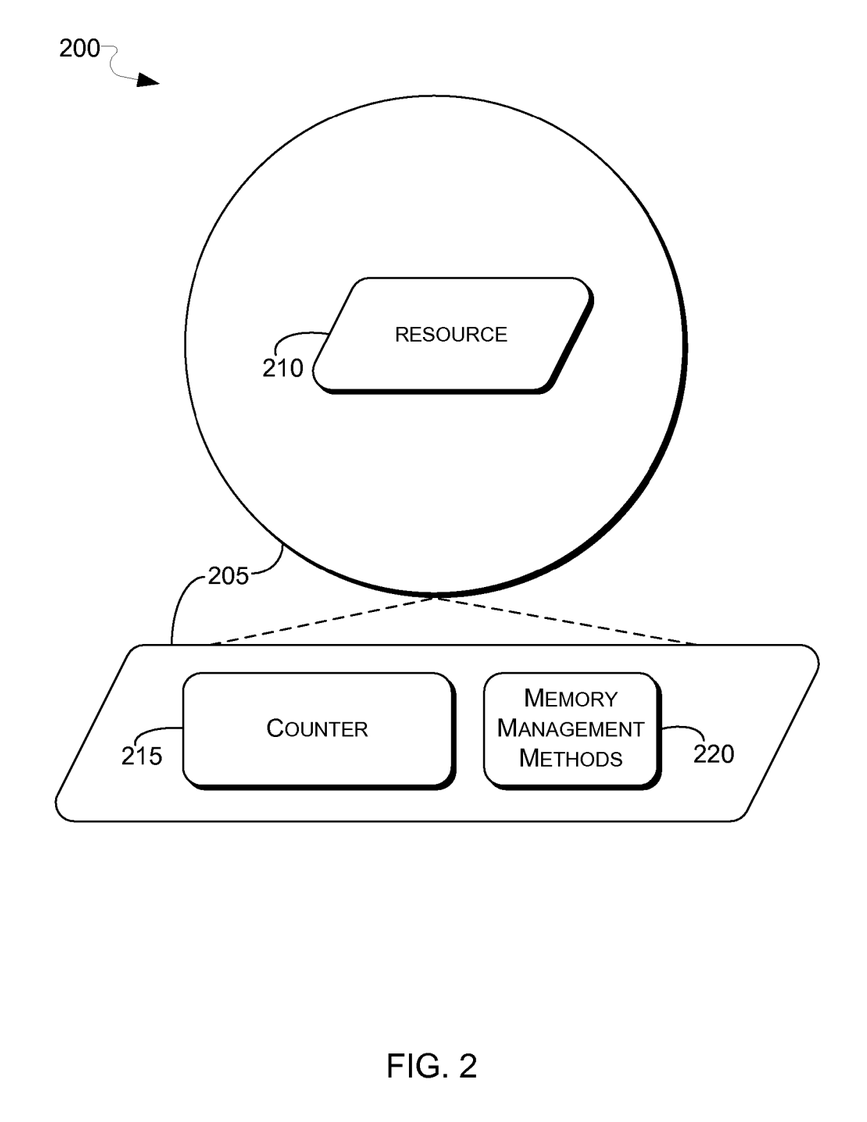
FIG. 2 is a block diagram illustrating an exemplary implementation of a safe buffer.

FIG. 2 is a block diagram illustrating an exemplary implementation of a safe buffer 200. The safe buffer 200 includes a wrapper 205 that wraps around a protected memory resource 210. Wrapper 205 is either a data structure or software that contains, or wraps around, protected resource 210. Wrapper 205 includes memory management methods 220. Memory management methods 220 include methods to read and write to memory. Wrapper 205 may also include a counter 215 to determine whether the resource 210 is available to be accessed.

Problems with accessing freed memory may occur when a write to a memory location occurs while the memory location is being freed. For example, a set function may be called to write a character to a memory location while a dispose function is being called to free the memory location. In this case, the write is being attempted at a memory location that may no longer be valid. In the presence of multiple threads, sometimes this memory location may be allocated by another thread, so the attempt to write to this location succeeds, even though the memory is not being used for its original purpose. Tracking down memory corruption in a multithreaded environment is often quite challenging.

In another example, consider the CLR, which enables interaction of managed code with unmanaged code. In this environment, unmanaged code (such as the Microsoft® Windows® kernel) typically serves as a handle administrator, and therefore interacts with managed code to utilize resources. More particularly, a handle that is detected by the handle administrator as not being used, even though the handle is tentatively released or otherwise suspended, may be closed, disposed, or subjected to some other finalizing method for the purpose of memory management or resource recycling. For example, in the Microsoft® .NET platform, the managed method of "garbage collection" aggressively cleans up unused objects to reclaim memory. However, if garbage collection occurs prematurely on a type containing a handle and that type provides a finalizer that releases a memory source, the resource would be prematurely finalized (or disposed), and another thread could be attempting to write to an invalid memory location.

Garbage collection typically involves both a step to detect unused objects and a second pass called finalization, where some unused objects are given a chance to run their own cleanup code to free another resource. It is possible for malicious code to "resurrect" an object that garbage collection determined was unused, which causes an object that was previously considered "dead" available for future use or coming back to "life." This "resurrection" may occur concurrently with running a finalizer and can be used to expose an object that is still usable, or one whose finalizer has completed, or one whose finalizer will run while you are manipulating the object. Depending on the type of resurrected object, this may open the door to correctness and/or security problems.

To solve these problems, safe buffer 200 is a handle to a protected memory resource that exploits methods to read and write to memory that ensure that reads and writes are to valid memory locations within buffer bounds.

An exemplary code implementation using the safe buffer class may be as follows:

```
Class SecureString {
    SafeBstrBuffer ptr;
    int length;
    SecureString ( ) {
        ptr=Virtual Alloc ( )
        Ptr.SetLength(length)
    }
    Void Set (char c, int index){
        ptr.Write (c, index);
    }
    Void Dispose{
        ptr.Dispose( ) ;
    }
}
```

Users may subclass the buffer class to provide an implementation of a safe resource wrapper for a resource. The example above presupposes a subclass of a safe buffer class, specialized for a particular string representation called a BSTR. The buffer class includes a length, which may be used to ensure that accesses do not exceed the length of the buffer. The Set function calls Write( ) to write the character to the proper memory location. The Dispose function may call a Virtual Free function to free the memory location if the memory location is not currently being accessed. The reference counter 215 may be used to determine whether to allow access to the memory resource and to ensure that the protected memory resource is not freed as it is being accessed. While the reference counter 215 is typically used within the safe buffer's memory management methods 220, it may optionally be made available to users directly to allow multiple accesses to memory to amortize the overhead of using the reference counter 215.

By implementing a safe resource wrapper for a memory resource, reads and writes to the memory resource may be performed in a safe manner. The safe buffer class may also serve as a building block for static analysis and verification.

Figure 3:
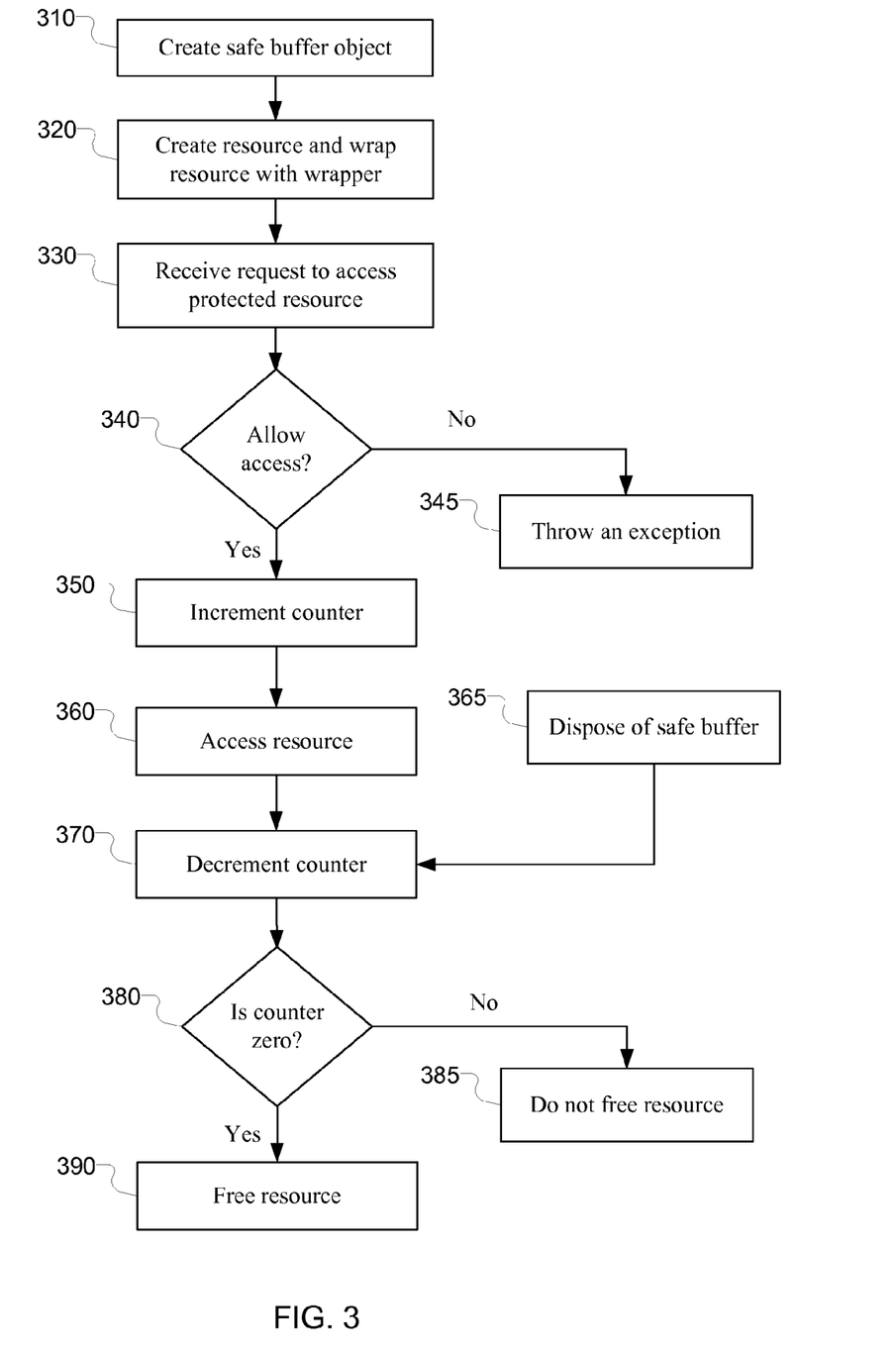
FIG. 3 is a flow diagram illustrating an exemplary process for implementing a safe buffer.

FIG. 3 is a flow diagram illustrating an exemplary process for implementing a safe buffer. While the description of FIG. 3 may be made with reference to other figures, it should be understood that the exemplary process illustrated in FIG. 3 is not intended to be limited to being associated with the systems or other contents of any specific figure or figures. Additionally, it should be understood that while the exemplary process of FIG. 3 indicates a particular order of operation execution, in one or more alternative implementations, the operations may be ordered differently. Furthermore, some of the steps and data illustrated in the exemplary process of FIG. 3 may not be necessary and may be omitted in some implementations. Finally, while the exemplary process of FIG. 3 contains multiple discrete steps, it should be recognized that in some environments some of these operations may be combined and executed at the same time.

At 310, a safe buffer object is created. For example, a runtime environment may recognize the need to create an instance of a subclass of a safe buffer. A safe buffer may be created for a runtime agent requiring a handle to access a resource upon which an operation is to be performed. Some runtime agents may create the safe buffer object before creating the underlying resource. At 320, a resource is created and a wrapper is wrapped around the resource. The wrapper may include memory management methods to ensure that accesses to memory are performed in a safe manner. The wrapper may include a counter that is set to one upon creation of the safe buffer object and decremented when the safe buffer object is disposed, such as through a finalizer or a dispose method.

At 330, a request is received to access the memory resource. At 340, a determination is made as to whether to allow access to the resource based at least in part on the value of the counter. For example, if the value of the counter is zero, this may indicate that the resource has been freed, so at 345, access may be denied. Access may be denied by throwing an exception, reporting an error, or via various other methods. Additionally, if the length of the safe buffer is tracked, then invalid accesses that exceed the length of the buffer may also be denied at 340.

If the value of the counter is greater than zero, then this may indicate that the resource may be safely accessed, so access may be allowed. At 350, the value of the counter is incremented, indicating that a thread is actively using the safe buffer's resource. Then, at 360, the resource may be accessed. After accessing the resource, at 370, the counter is decremented to indicate that one less thread is using the safe buffer. Separately, at 365, when the safe buffer is disposed, such as through a finalizer or a dispose method, then the counter is also decremented at 370.

At 380, the value of counter is checked to determine if it is zero. If the counter is nonzero, this may indicate that one or more threads are still using the safe buffer, so at 385, the resource is not freed. If the counter is zero, then this may indicate that no threads are currently using the safe buffer, and the safe buffer has been disposed, so the resource is freed at 390. By ensuring the resource is only freed when no other threads are using it in a thread-safe fashion, corruption problems due to malicious abuse of the resource, resurrection, or imperfect programming practices are prevented.

The above is one example of a process for implementing a safe buffer. It is understood that in other implementations, various other steps and runtime checks may be implemented to ensure safe accesses to memory.

For instance, in one alternative, the counter may represent the number of threads accessing the resource. When the counter is zero, this may indicate that no threads are accessing the resource. Therefore, access to the resource may be allowed. If the counter is nonzero, this may indicate that one or more threads are accessing the resource and the current request for access to the resource may be denied or postponed until another thread decrements the counter to zero. The decision to release the resource may be made based on the value of the counter and either additional state in the object or the lifetime of the safe buffer object. Various other implementations may also be used.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A computer-implemented method, comprising:
    creating a safe buffer associated with a memory resource, the safe buffer created for a runtime agent executing in a managed execution environment;
    wrapping the memory resource with a wrapper, the wrapper including a counter, wherein a value of the counter indicates a number of threads that are using the safe buffer created for the runtime agent executing in the managed execution environment, and wherein the value of the counter is set to one upon creation of the safe buffer;
    upon determining that a thread is using the safe buffer, incrementing the value of the counter;
    upon determining that the thread is no longer using the safe buffer, decrementing the value of the counter;
    upon determining that the safe buffer has been disposed, setting the value of the counter to zero;
    receiving a request to access the memory resource; and
    determining whether to allow access to the memory resource in response to the request based on at least the value of the counter, wherein access to the memory resource is denied when the value of the counter is zero, a zero value indicating that the memory resource has been freed and is not safely accessible.

2. The computer-implemented method of claim 1, wherein access to the memory resource is allowed in response to the request when the value of the counter is greater than zero, a nonzero value indicating that the memory resource has not been freed and is safely accessible.

3. The computer-implemented method of claim 1, wherein access to the memory resource is denied by generating an exception.

4. The computer-implemented method of claim 1, wherein access to the memory resource is denied by reporting an error.

5. The computer-implemented method of claim 1, further comprising:
    tracking a length of the safe buffer; and
    determining whether the request to access the memory resource exceeds the length of the safe buffer.

6. The computer-implemented method of claim 5, wherein access to the memory resource is denied when the request to access the memory resource exceeds the length of the safe buffer.

7. The computer-implemented method of claim 5, wherein access to the memory resource is allowed when the request to access the memory resource does not exceed the length of the safe buffer and when the value of the counter is greater than zero.

8. The computer-implemented method of claim 1, wherein accessing the request to access the memory resource includes a request to write data to the memory resource.

9. The computer-implemented method of claim 1, wherein the request to access the memory resource includes a request to read data of the memory resource.

10. The computer-implemented method of claim 1, wherein the managed execution environment includes a common language runtime (CLR) execution environment.

11. The computer-implemented method of claim 1, wherein the managed execution environment enables interaction of managed code and unmanaged code, wherein the managed code is compiled and platform independent.

12. A computer-implemented method, comprising:
    creating a safe buffer associated with a memory resource, the safe buffer created for a runtime agent executing in a managed execution environment;
    wrapping the memory resource with a wrapper, the wrapper including a counter that is set to one upon creation of the safe buffer, wherein a value of the counter indicates a number of threads that are using the safe buffer created for the runtime agent executing in the managed execution environment, and wherein the value of the counter is set to one upon creation of the safe buffer;
    upon determining that a thread is using the safe buffer, incrementing the value of the counter;

upon determining that the thread is no longer using the safe buffer, decrementing the value of the counter;

upon determining that the safe buffer has been disposed, setting the value of the counter to zero;

receiving a request to access the memory resource; and determining whether to allow access to the memory resource in response to the request based on at least the value of the counter, wherein access to the memory resource is denied when the value of the counter is greater than zero, a nonzero value indicating that one or more threads are using the safe buffer;

receiving a second request to free the memory resource; and determining whether to free the memory resource in response to the second request based on the value of the counter, wherein the memory resource is not freed when the value of the counter is greater than zero, and wherein the memory resource is freed when the value of the counter is zero, a zero value indicating that no threads are using the safe buffer and that the safe buffer has been disposed.

13. The computer-implemented method of claim 12, wherein access to the memory resource is allowed in response to the request when the value of the counter is zero.

14. The computer-implemented method of claim 12, wherein access to the memory resource is postponed in response to the request until the value of the counter is zero.

15. A memory comprising instructions that, when executed by a processor, cause the processor to:

create a safe buffer associated with a memory resource, the safe buffer created for a runtime agent executing in a managed execution environment;

wrap the memory resource with a wrapper, the wrapper including a counter, wherein a value of the counter indicates a number of threads that are currently using the safe buffer created for the runtime agent executing in the managed execution environment;

set the value of the counter to one upon creation of the safe buffer;

increment the value of the counter upon determining that a thread is using the safe buffer;

decrement the value of the counter upon determining that the thread is no longer using the safe buffer;

set the value of the counter to zero u on determining that the safe buffer has been disposed;

determine whether the value of the counter is zero in response to receiving a request to access the memory resource;

allow access to the memory resource when the counter is greater than zero and deny access to the memory resource when the counter is zero, wherein a nonzero value indicates that one or more threads are using the safe buffer and that the memory resource is safely accessible, and wherein a zero value indicates that the memory resource has been freed and is not safely accessible.

16. The memory of claim 15, further comprising instructions that, when executed by the processor, cause the processor to:

track a length of the safe buffer; and determine whether the request to access the memory resource exceeds the length of the safe buffer.

17. The memory of claim 16, further comprising instructions that, when executed by the processor, cause the processor to:

deny access to the memory resource when the request to access the memory resource exceeds the length of the safe buffer.

18. The memory of claim 16, further comprising instructions that, when executed by the processor, cause the processor to:

allow access to the memory resource when the request to access the memory resource does not exceed the length of the safe buffer and when the value of the counter is greater than zero.

19. The computer-implemented method of claim 11, wherein the memory resource is freed when the value of the counter is zero, a zero value indicating that no threads are using the safe buffer and that the safe buffer has been disposed.

20. The memory of claim 15, further comprising instructions that, when executed by the processor, cause the processor to:

determine whether to free the memory resource in response to a second request to free the memory resource based on the value of the counter;

free the memory resource when the value of the counter is zero, a zero value indicating that no threads are using the safe buffer and that the safe buffer has been disposed; and reject the second request to free the memory resource when the value of the counter is greater than zero, a nonzero value indicating that one or more threads are using the safe buffer.

* * * * *

UNITED STATES PATENT AND TRADEMARK OFFICE
CERTIFICATE OF CORRECTION

| | | |
|---|---|---|
| PATENT NO. | : 8,095,513 B2 | Page 1 of 1 |
| APPLICATION NO. | : 11/422297 | |
| DATED | : January 10, 2012 | |
| INVENTOR(S) | : Brian M. Grunkemeyer et al. | |

It is certified that error appears in the above-identified patent and that said Letters Patent is hereby corrected as shown below:

In column 8, line 43, in Claim 8, before "the request" delete "accessing".

In column 9, line 5, in Claim 12, after "resource;" delete "and".

Signed and Sealed this
Twenty-eighth Day of February, 2012

David J. Kappos
*Director of the United States Patent and Trademark Office*